United States Patent [19]

Gaven

[11] 3,760,124

[45] Sept. 18, 1973

[54] DICTATOR-TRANSCRIBER INDEXING SYSTEM

[75] Inventor: Thomas J. Gaven, Livingston, N.J.

[73] Assignee: McGraw-Edison Company, Elgin, Ill.

[22] Filed: Feb. 14, 1972

[21] Appl. No.: 225,799

[52] U.S. Cl. ................. 179/100.2 Z, 179/100.1 DR, 179/100.2 S

[51] Int. Cl. ....................... G11b 23/42, G11b 27/12

[58] Field of Search ............... 179/100.2 Z, 100.2 S, 179/100.2 MD, 100.1 DR, 100.1 VC, 100.1 PS; 274/4 C, 11 B, 11 D

[56] References Cited

UNITED STATES PATENTS

| | | | |
|---|---|---|---|
| 3,470,777 | 10/1969 | Flubacker | 179/100.1 DR |
| 3,601,556 | 8/1971 | Cooper, Jr. et al. | 179/100.2 Z |
| 2,329,107 | 9/1943 | Clausen | 179/100.1 DR |
| 3,601,554 | 8/1971 | Rak | 179/100.2 Z |

*Primary Examiner*—Vincent P. Canney
*Assistant Examiner*—Alfred H. Eddleman
*Attorney*—George H. Fritzinger

[57] ABSTRACT

A new indexing system for a tape-record dictating and transcribing machine is provided wherein a dictator records distinguishing electrical indexing signals signifying length and correction marks either in superimposed relation to the audio signals or on a separate track of the tape. The transcriber then generates visible index marks on an index slip as she rewinds the tape preparatory to transcribing the dictation and utilizes the index slip in the usual way during the transcribing operation.

5 Claims, 6 Drawing Figures

DICTATOR-TRANSCRIBER INDEXING SYSTEM

It has long been the practise in the dictating machine field to provide dictation machines with means for making length and correction marks on an index slip as the dictator records the dictation. The index slip is then attached to the record medium and given to a transcriber who then utilizes the index slip in the usual way as an aid in typing error-free copies of the dictation and in spacing the individual items, letters, etc. on the respective sheets. Although it has not been difficult to attach the index slip to a record medium such as a disk, cylinder, etc., there has been still the problem of the index slip becoming detached and lost in the transport of the records from the dictator to the transcriber. These problems are compounded all the more in tape record dictating machines because of the difficulty of attaching the usual index slip to a tape magazine or cassette.

An object of the invention is to provide a new indexing system which eliminates the need for attaching an index slip to the record medium and transporting it with the record medium from the dictator to the transcriber.

Another object is to provide such new indexing system for tape-record machines wherein the dictator makes length and correction notations during the recording of his dictation by recording suitable distinguishing electrical signals on the tape either in superimposed relation to the audio signals without destroying the inteligibility of the latter or on a separate track of the tape.

Another object is to provide an economical dictator-transcriber indexing system which simplifies the equipment required in the dictating machine.

Another object is to provide a transcribing machine with a simple attachment which permits the transcriber to make index marks on an index slip corresponding to the index signals recorded on the tape as the tape is rewound preparatory to transcribing the recorded dictation.

These and other objects and features of the invention will be apparent from the following description and the appended claims:

In the description of my invention, reference is had to the accompanying drawings, of which:

Figures 1, 2, 3, 4, 5, 6:
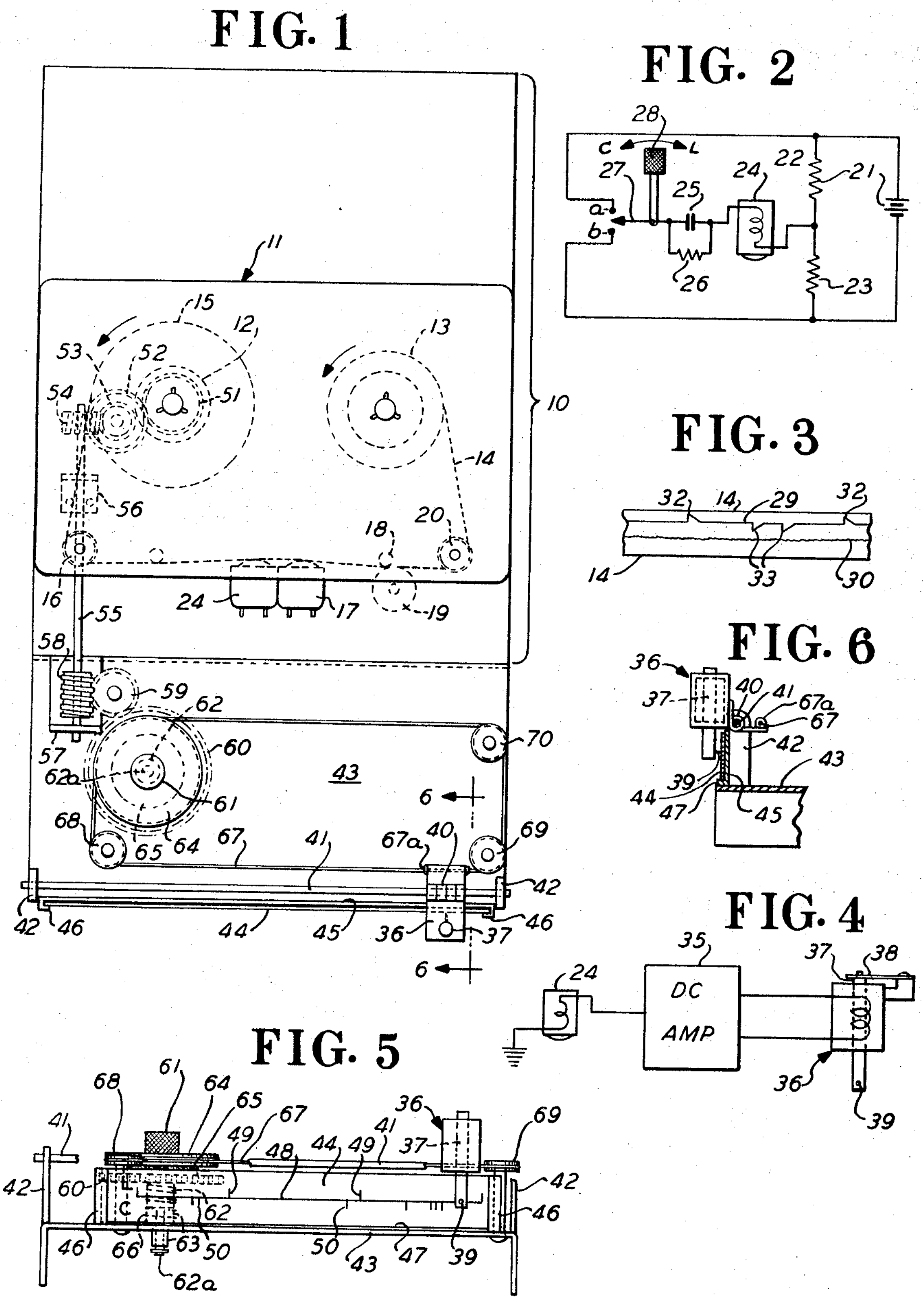
FIG. 1 is a plan view of a cassette type tape recorder and/or reproducer having an attached transcriber mechanism for making visual marks on an index slip as the tape is wound from one reel to the other.
FIG. 2 is a diagram of the circuit in the dictator's machine for recording "length" and "correction" index signals on the tape.
FIG. 3 illustrates the character of the recorded index signals on the tape.
FIG. 4 is a diagram of the circuitry at the transcriber's machine for actuating an index marker by the index signals.
FIG. 5 is a front elevational view of the machine shown in FIG. 1.
FIG. 6 is a section on the line 6—6 of FIG. 1.

The dictating machine usable in connection with the present invention may be any commercial tape recorder for example of the cassette type indicated by the portion 10 of FIG. 1 and fully described in the pending Kobler et al. application Ser. No. 198,875, filed Nov. 15, 1971. This machine is adapted to receive a cassette 11 having therein a supply reel 12 and a take-up reel 13 for a tape 14. A supply roll 15 of tape on the supply roll 12 is unwound by drawing the tape around a first guide roller 16 and past a record-reproduce head 17, and then between a drive capstan 18 and pinch roller 19 and around a second guide roller 20 back to the take-up reel 13. In the normal record-reproduce operations the capstan 18 and pinch roller 19 are engaged to drive the tape at a steady speed and the take-up reel 13 is overdriven through a suitable slip clutch to keep the tape taut in advance of the capstan. During a fast forward or a rewind operation the capstan 18 and pinch roller 19 are disengaged and either the take-up reel 13 or the supply reel 12 is driven directly at a fast speed to accomplish the fast forward or rewind of the tape. These control operations are effected by pressing respective push buttons at the front of the recorder but these are not herein shown since the present invention is not concerned with the control or operating mechanism of the recorder and such mechanism is described in the pending Kobler et al application aforementioned.

The only special equipment in a dictating machine for the purpose of the present invention is a means to enable the dictator to record distinguishing electrical signals on the tape, at will, to indicate points where length and correction notations are made. This indexing means may comprise simply a battery 21 or other d. c. source of potential connected across a pair of resistors 22 and 23 in series (FIG. 2). Connected serially in shunt relation to the resistor 22 is a record head 24, condenser 25 and resistor 26 in parallel and *a* contact of a single pole switch 27 operable by a handle 28. Similarly, connected serially in shunt relation to the resistor 23 is the same record head 24, RC combination 25–26, and *b* contact of the switch 27. The record head 24 registers with a track 29 of the tape 14 (FIG. 3) separate from the audio track 30 formed by the record-reproduce head 17. However, alternatively, the index circuit of FIG. 2 may be connected to the record-reproduce head 17 instead of the separate head 24 in which case the indexing signals would be superimposed on the audio signals.

When the handle 28 is pressed into the length position "L" a d. c. pulse of a duration determined by the RC circuit 25–26 passes through the record head 24 to form a pulse 32 on the index track 29 of one polarity as shown in FIG. 3. When the handle 28 is pressed in the direction marked "C" to make a correction mark a pulse 33 of identical form is formed on the index track 29 of an opposite polarity. If these signal pulses were recorded by the audio head 17 in the audio track 30 they produce simply slick sounds which would not destroy the inteligibility of the recording.

The dictator will normally not rewind the tape before he hands the magazine or cassette to the transcriber, leaving the transcriber with a first operation of rewinding the tape preliminary to transcribing the recorded dictation. By the present invention the transcriber forms index marks on an index slip in correspondence with the index signals recorded on the tape as the tape is rewound from one reel to the other whether the winding is in a forward or reverse direction. However, a step is eliminated when the dictator hands the cassette to the transcriber without having first rewound the tape because then the transcriber can form the visible marks on the index slip during the rewind operation. The extra electrical equipment at the transcriber's machine for the present indexing system (FIG. 4) comprises a reproduce head 34 registering with the index track 29 feeding through a d. c. amplifier 35 which in turn feeds into a polarized indexing head 36 having a permanent magnet armature 37 biased into a central position by a light cantilever spring 38 and having a transverse stylus or needle point 39 at one end.

The index head 36 is mounted slidably and pivotally by a slidable hinge 40 (FIG. 1) on a cross rod 41 supported at its ends by upright lugs 42 on a table 43 secured to the front of the transcriber's machine. This machine may be of the same basic character as the tape recorder 10 for the dictator as before described. The slidable hinge connection 40 of the head 36 on the rod 41 causes the head to tilt forwardly and downwardly by its own weight bringing the stylus 39 with pressure against an index slip 44 mounted below the head 36 on a flange 45 turned up from the table 43 as shown in FIG. 6. At the ends of this flange are lips 46 turned back to grip the ends of the index slip 44 and at the bottom of the flange is a lip 47 to support the index slip vertically. Thus as the head 36 is moved along the index slip it describes a straight line 48 along the center of the slip. When the head is activated by a length pulse picked up from the tape during the rewind operation the armature 37 is jogged upwardly to cause the stylus to scribe respective length marks 49 above the medial line 48. Alternatively, when the index head 36 is activated by correction pulses picked up from the tape the armature 37 is jogged downwardly to scribe respective correction marks 50 below the medial line 48.

The index head 36 is driven from the supply reel 12 through a coupling mechanism comprising a gear 51 on the spindle of the supply reel meshing with a gear 52 journaled in the frame of the machine 10 and having thereon a worm gear 53 meshing with a pinion gear 54 on a front-to-back extending shaft 55. The shaft is journaled in a bracket 56 near its rearward end upstanding from the frame of the machine 10 and in a bracket 57 at its forward end upstanding from the table 43. Secured to the shaft 55 at its forward end is a worm gear 58 meshing with a pinion gear 59 journaled on a shaft upstanding from the table 43. The pinion gear 59 meshes with a gear 60 journaled on a vertical shaft 62. The shaft 62 has a reduced diameter end portion **62*a* at its lower end journaled in a fixed bearing 63 staked to the table 43. Secured to the upper end of the shaft 62 above the gear 60 is a pulley 64 provided with a cork disk 65 between it and the top face of the gear 60. Between the table 43 and the bottom face of the gear 60 is a compression spring 66 which urges the gear 60 upwardly to provide a friction-slip clutch between the gear and the pulley 64. Trained one revolution around the pulley is a cord belt 67 which leads forwardly from the pulley around a front guide roller 68 at the left side of the table 43 then across the table to a guide roller 69 at the right side of the table 43 and then back around an idler roller 70 to the pulley 63. The front run of the cord belt 67 is secured at 67*a* to the hinge 40** of the index head.

In practice, the transcriber will first turn the pulley 64 by knob 61 to move the index head to its right end of travel regardless of the amount of dictation recorded on the tape. As she rewinds the tape the index head 36 is moved progressively to the left and the length and correction marks are made by the recorded index signals as shown. The extent of the leftward movement of the index head will depend upon the percentage of the tape which has been recorded, the movement being the full length of the index slip 44 if the tape in the cassette has been recorded through its full length and being to a lesser extent when a lesser portion of the tape has been recorded.

By driving the index head from the supply reel 12 the movement of the index head is not in linear proportion with the movement of the tape past the audio head 17 but is at a progressively lower rate in the ratio of about 5 to 3 as the full length of the tape is rewound from the take-up reel back to the supply reel. However, as the transcriber types the recorded dictation there is preserved the same relationship between the drive of the index head and the drive of the tape notwithstanding that the tape is now driven at a fixed speed by the capstan 18. Accordingly, each index mark on the index slip 44 is reached by the stylus 39 of the head 36 at the same point along the tape where the dictator made the corresponding electrical index signal.

In the more expeditious use of the invention accomplished by the transcriber producing the visible index marks on the index slip 44 during the rewind of the tape, the visible indexing is produced starting from the right end of the index slip as before described. The visible indexing can however be made to start from the left end of the index slip simply by first rewinding the tape without marking the index slip, then advancing the tape for the duration of the recording of the dictation while producing the visible marks on the index slip and then again rewinding the tape before transcribing the recorded dictation. This would require the two additional operations but will accomplish no more than to displace the visible indexing to start from the left end of the index slip instead of from the right end thereof. The accuracy of the indexing would in each case be the same.

The embodiment of my invention herein particularly shown and described is intended to be illustrative and not limitative of my invention since the same is subject to changes and modifications without departure from the scope of my invention, which I endeavor to express according to the following claims.

I claim:

1. In a dictation-transcribing system: the method comprising first recording dictation along a tape and concurrently recording index signals at points along the tape indicating length and/or correction marks, scanning said tape to reproduce said index signals and concurrently making visible marks at points along an index slip corresponding to the points whereat said index signals are recorded on the tape, and next transcribing the recorded dictation from said tape while concurrently moving an indicator along said index slip in accordance with the scanning along the tape to give the transcriber a visual indication whereat said length and/or correction marks have been made.

2. The system set forth in claim 1 including the steps of recording signals of different character on said tape to designate "length" and "correction" marks, and producing actuations of different character as said signals are reproduced for providing different marks on said index slip.

3. In a dictation-transcribing system set forth in claim 1, the method wherein signal pulses of one polarity are recorded on said tape to designate "length" and signal pulses of the opposite polarity are recorded on said tape to designate "corrections," and wherein said visible marks are displaced from a medial position in one direction by signals of one polarity and in the other direction from said medial position by signals of the opposite polarity.

4. The system set forth in claim 1 wherein the transcriber after receiving said tape from a dictator first rewinds the tape to return the tape to the point where said dictator started his recording of dictation, and wherein said visible marks are made on said index slip during said rewinding of the tape.

5. In a dictation-transcribing system: the steps comprising a recording of dictation and of index signals on a record medium as the record medium is advanced, the backfeeding of said record medium at a transcriber's station to return the record medium to the starting point of the dictator and the making during said backfeeding of said record medium of visible index marks on an index slip at points along the slip corresponding to the points along the record medium whereat said index signals are recorded.

* * * * *